United States Patent
Radford et al.

(10) Patent No.: US 9,836,453 B2
(45) Date of Patent: Dec. 5, 2017

(54) DOCUMENT-SPECIFIC GAZETTEERS FOR NAMED ENTITY RECOGNITION

(71) Applicant: Conduent Business Services, LLC, Dallas, TX (US)

(72) Inventors: William Radford, Grenoble (FR); Xavier Carreras, Saint Ismier (FR); James Brinton Henderson, Vessy (CH)

(73) Assignee: Conduent Business Services, LLC, Dallas, TX (US)

( * ) Notice: Subject to any disclaimer, the term of this patent is extended or adjusted under 35 U.S.C. 154(b) by 64 days.

(21) Appl. No.: 14/837,687

(22) Filed: Aug. 27, 2015

(65) Prior Publication Data

US 2017/0060835 A1   Mar. 2, 2017

(51) Int. Cl.
  *G06F 17/27* (2006.01)
  *G06F 17/20* (2006.01)
  *G06F 17/30* (2006.01)
  *G06K 9/00* (2006.01)

(52) U.S. Cl.
  CPC ......... *G06F 17/278* (2013.01); *G06F 17/277* (2013.01); *G06F 17/30011* (2013.01); *G06F 17/30604* (2013.01); *G06F 17/30705* (2013.01); *G06K 9/00463* (2013.01)

(58) Field of Classification Search
  None
  See application file for complete search history.

(56) References Cited

U.S. PATENT DOCUMENTS

| | | |
|---|---|---|
| 6,182,026 B1 | 1/2001 | Tillmann et al. |
| 6,263,335 B1 | 7/2001 | Paik et al. |
| 6,311,152 B1 | 10/2001 | Bai et al. |
| 6,975,766 B2 | 12/2005 | Fukushima |
| 7,058,567 B2 | 6/2006 | Aït-Mokhtar et al. |
| 7,171,350 B2 | 1/2007 | Lin et al. |

(Continued)

OTHER PUBLICATIONS

Collins, et al., "Discriminative Reranking for Natural Language Parsing," Computational Linguistics, vol. 31.1, pp. 25-70 (2005).

(Continued)

*Primary Examiner* — Marcus T Riley
(74) *Attorney, Agent, or Firm* — Fay Sharpe LLP

(57) ABSTRACT

A method for entity recognition employs document-level entity tags which correspond to mentions appearing in the document, without specifying their locations. A named entity recognition model is trained on features extracted from text samples tagged with document-level entity tags. A text document to be labeled is received, the text document being tagged with at least one document-level entity tag. A document-specific gazetteer is generated, based on the at least one document-level entity tag. The gazetteer includes a set of entries, one entry for each of a set of entity names. For a text sequence of the document, features for tokens of the text sequence are extracted. The features include document-specific features for tokens matching at least a part of the entity name of one of the gazetteer entries. Entity labels are predicted for the tokens in the text sequence with the named entity recognition model, based on the extracted features.

20 Claims, 5 Drawing Sheets

(56) References Cited

U.S. PATENT DOCUMENTS

| | | | |
|---|---|---|---|
| 8,260,785 B2* | 9/2012 | Hogue | G06F 17/30887 707/747 |
| 8,429,099 B1* | 4/2013 | Perkowitz | G06Q 10/10 706/12 |
| 8,543,563 B1 | 9/2013 | Nikoulina et al. | |
| 9,292,797 B2* | 3/2016 | He | G06N 5/02 |
| 9,575,963 B2* | 2/2017 | Pasupalak | G06F 17/27 |
| 2004/0024581 A1 | 2/2004 | Koehn et al. | |
| 2004/0030551 A1 | 2/2004 | Marcu et al. | |
| 2006/0190241 A1 | 8/2006 | Goutte et al. | |
| 2007/0150257 A1 | 6/2007 | Cancedda et al. | |
| 2007/0265825 A1 | 11/2007 | Cancedda et al. | |
| 2008/0052262 A1* | 2/2008 | Kosinov | G06F 17/30244 |
| 2008/0300857 A1 | 12/2008 | Barbaiani et al. | |
| 2008/0319978 A1 | 12/2008 | Brun et al. | |
| 2009/0204596 A1 | 8/2009 | Brun et al. | |
| 2010/0070521 A1 | 3/2010 | Clinchant et al. | |
| 2010/0082331 A1 | 4/2010 | Brun et al. | |
| 2011/0099184 A1* | 4/2011 | Symington | G06F 17/30716 707/755 |
| 2013/0311467 A1 | 11/2013 | Gallé et al. | |
| 2014/0142922 A1 | 5/2014 | Liang et al. | |
| 2014/0163951 A1 | 6/2014 | Nikoulina et al. | |
| 2014/0172754 A1* | 6/2014 | He | G06N 99/005 706/12 |
| 2015/0039613 A1* | 2/2015 | Li | G06F 17/30958 707/737 |
| 2015/0066479 A1* | 3/2015 | Pasupalak | G06F 17/27 704/9 |
| 2015/0286629 A1* | 10/2015 | Abdel-Reheem | G06F 17/2827 704/9 |

OTHER PUBLICATIONS

Cucerzan, "Large-scale named entity disambiguation based on Wikipedia data," Proc. 2007 Joint Conf. on Empirical Methods in Natural Language Processing and Computational Natural Language Learning (EMNLPCoNLL), pp. 708-716 (2007).

Freund, et al., "A decision-theoretic generalization of on-line learning and an application to boosting," J.Computer and System Sciences, vol. 55(1), pp. 119-139 (1997).

Hoffart, et al., "Robust disambiguation of named entities in text," Proc. 2011 Conf. on Empirical Methods in Natural Language Processing, pp. 782-792 (2011).

Jung, et al., "LN-Annote: An alternative approach to information extraction from emails using locally customized named-entity recognition," Proc. 24th Int'l Conf. on World WideWeb, WWW'15, pp. 538-548 (2015).

Kataria, et al., "Entity disambiguation with hierarchical topic models," Proc. 17th ACM SIGKDD Int'l Conf. on Knowledge Discovery and Data Mining, pp. 1037-1045 (2011).

Kazama et al., "Exploiting Wikipedia as external knowledge for named entity recognition," Proc. 2007 Joint Conf. on Empirical Methods in Natural Language Processing and Computational Natural Language Learning (EMNLP-CoNLL), pp. 698-707 (2007).

Lafferty, et al., "Conditional random fields: Probabilistic models for segmenting and labeling sequence data," Proc. $18^{th}$ Int'l Conf. on Machine Learning, ICML '01, pp. 282-289 (2001).

Aït-Mokhtar, et al., "Robustness beyond shallowness: incremental deep parsing," Special Issue of the NLE Journal, pp. 121-144 (2002).

Morgan, et al., "Gene name extraction using flybase resources," Proc. ACL 2003 Workshop on Natural Language Processing in Biomedicine, pp. 1-8 (2003).

Nadeau, et al., "A survey of named entity recognition and classification," *Linguisticae Investigationes*, 30(1):3-26 (2007).

Nothman, et al., "Learning multilingual named entity recognition from Wikipedia," Artificial Intelligence, 194(0):151-175 (2013).

Okazaki, CRFsuite: a fast implementation of conditional random fields (crfs) (available at http://www.chokkan.org/software/crfsuite) pp. 1-4 (2007).

Passos, et al., "Lexicon infused phrase embeddings for named entity resolution," Proc. 18th Conf. on Computational Natural Language Learning, pp. 78-86 (2014).

Rahman et al., "Coreference resolution with world knowledge," Proc. 49th Annual Meeting of the Assoc. for Computational Linguistics: Human Language Technologies, pp. 814-824 (2011).

Ratinov et al., "Design challenges and misconceptions in named entity recognition," Proc. 13th Conf. on Computational Natural Language Learning (CoNLL-2009), pp. 147-155 (2009).

Ratinov, et al., "Local and global algorithms for disambiguation to Wikipedia," Proc.49th Annual Meeting of the Assoc. for Computational Linguistics: Human Language Technologies, pp. 1375-1384 (2011).

Richman, et al., "Mining wiki resources for multilingual named entity recognition," Proc. ACL-08: HLT, pp. 1-9 (2008).

Roberts, et al., "Combining terminology resources and statistical methods for entity recognition: an evaluation," Proc. 6th Int'l Conf. on Language Resources and Evaluation (LREC'08), pp. 2974-2980 (2008).

Sandhaus, "The New York Times Annotated Corpus-Overview," Linguistic Data Consortium, Philadelphia, vol. 6(12), pp. 1-22 (2008).

Sang et al., "Introduction to the CoNLL-2003 shared task: Language independent named entity recognition," Proc. 7th Conf. on Natural Language Learning at HLT-NAACL 2003, pp. 142-147 (2003).

Turian, et al., "Word representations: A simple and general method for semi-supervised learning," Proc. 48th Annual Meeting of the ACL, pp. 384-394 (2010).

Vlachos, et al., "Bootstrapping and evaluating named entity recognition in the biomedical domain," Proc. HLT-NAACL BioNLPWorkshop on Linking Natural Language and Biology, pp. 138-145 (2006).

Che, et al., "Named Entity Recognition with Bilingual Constraints," Proceedings of the Conference of the North American Chapter of the Association for Computational Linguistics, pp. 52-62 (Jan. 2013).

Bunescu, et al., "Learning for Collective Information Extraction," downloaded from http://www.cs.utexas.edu/~ml/papers/cie-proposal-05.pdf on Jun. 6, 2017, pp. 1-45 (2004).

* cited by examiner

DOCUMENT-SPECIFIC GAZETTEERS FOR NAMED ENTITY RECOGNITION

BACKGROUND

The exemplary embodiment relates to named entity recognition and finds particular application in a system and method which make use of document-level entity name and type tags.

Named entity recognition (NER) generally entails identifying names (one or more words) in text and assigning them a type (e.g., person, location, organization). State-of-the-art supervised approaches use statistical models that incorporate a name's form, its linguistic context, and its compatibility with known names. These models are typically trained using supervised machine learning and rely on large collections of text where each name has been manually annotated, specifying the word span and named entity type. This process is useful for training models, but is manually time consuming and expensive to provide a label for every occurrence of a name in a document.

Gazetteers are large name lists of a particular type mined from external resources such as Wikipedia, mapping data, or censuses. A common use is to generate a binary feature for the NER model if a word is part of a known name. For example, Bob is more likely to be a name than went as it appears in a large list of person names. The names in the gazetteer do not need to be categorized with the same type scheme as is applied in the NER task (e.g., the type may simply be large_list_of_people). The goal of gazetteers is to improve recall by including known names that are not necessarily seen in the annotated training data used to train the NER model.

Although statistical NER systems developed for English newswire services perform well on standard datasets, performance declines once the data varies in language and domain.

There has been considerable work on incorporating external knowledge into NER models. For an overview, see David Nadeau, et al., "A survey of named entity recognition and classification," Linguisticae Investigationes, 30(1):3-26, 2007. For example, one method is to use a structured encoding for each gazetteer entry. See, Jun'ichi Kazama et al., "Exploiting Wikipedia as external knowledge for named entity recognition," Proc. 2007 Joint Conf. on Empirical Methods in Natural Language Processing and Computational Natural Language Learning (EMNLP-CoNLL), pp. 698-707, 2007 (hereinafter, Kazama 2007). A set of features is used for the encoding. The features may be used for modeling labels in a CRF model, as described, for example, in Lev Ratinov, et al., "Design challenges and misconceptions in named entity recognition," Proc. 13th Conf. on Computational Natural Language Learning (CoNLL-2009), pp. 147-155, 2009, hereinafter, "Ratinov 2009". Linking data to a knowledge base (KB) has also been used to assist in NER, as described in Angus Roberts, et al., "Combining terminology resources and statistical methods for entity recognition: an evaluation," Proc. 6th Intl Conf. on Language Resources and Evaluation (LREC'08), pp. 2974-2980, 2008).

Linked data has also been used as a data acquisition strategy for NER, specifically creating training data from Wikipedia (Kazama 2007, Alexander E. Richman, et al., "Mining wiki resources for multilingual named entity recognition," Proc. ACL-08: HLT, pp. 1-9, 2008, Joel Nothman, et al., "Learning multilingual named entity recognition from Wikipedia," Artificial Intelligence, 194(0):151-175, 2013) or gene name articles (Andreas Vlachos, et al., "Bootstrapping and evaluating named entity recognition in the biomedical domain," Proc. HLT-NAACL BioNLP Workshop on Linking Natural Language and Biology, pp. 138-145, 2006; Alex Morgan, et al., "Gene name extraction using flybase resources," Proc. ACL 2003 Workshop on Natural Language Processing in Biomedicine, pp. 1-8, 2003). The goal of these methods is to generate large quantities of training data for standard NER models.

Representing external knowledge in vector space embeddings (e.g., Brown clusters, Neural language models, or Skip-gram models) has also been shown to be effective for NER (Ratinov 2009; Joseph Turian, et al., "Word representations: A simple and general method for semi-supervised learning," Proc. 48th Annual Meeting of the ACL, pp. 384-394, 2010; Alexandre Passos, et al., "Lexicon infused phrase embeddings for named entity resolution," Proc. 18th Conf. on Computational Natural Language Learning, pp. 78-86, 2014).

However, such methods generally entail building a sizable NER model and do not take into account the document being processed.

There remains a need for a system and method for improving the performance of an NER model without requiring the collection and use of large amounts of additional training data for training the model.

INCORPORATION BY REFERENCE

The following references, the disclosures of which are incorporated herein in their entireties by reference, are mentioned:

U.S. Pub. No. 20080052262, published Feb. 28, 2008, entitled METHOD FOR PERSONALIZED NAMED ENTITY RECOGNITION, by Kosinov, et al., describes a method of personalized named entity recognition which includes parsing input text to determine a subset of the input text and generating queries based thereon which are submitted to reference resources. Classification is performed based on a response vector and a set of model parameters to determine a likely named entity category to which the input text belongs.

U.S. Pub. No. 20140172754, published Jun. 19, 2014, entitled SEMI-SUPERVISED DATA INTEGRATION MODEL FOR NAMED ENTITY CLASSIFICATION, by He, et al., discloses a method for providing a semi-supervised data integration model for named entity classification from a first repository of entity information in view of an auxiliary repository of classification assistance data which includes extracting positive and negative examples that are used to update a decision tree and classification rules.

The use of conditional random fields in entity recognition is described, for example, in U.S. Pub. No. 20150039613, published Feb. 5, 2015, entitled FRAMEWORK FOR LARGE-SCALE MULTI-LABEL CLASSIFICATION, by Li, et al.; and U.S. Pub. No. 20150066479, published Mar. 5, 2015, entitled CONVERSATIONAL AGENT, by Pasupalak, et al.

BRIEF DESCRIPTION

In accordance with one aspect of the exemplary embodiment, an entity recognition method includes providing a named entity recognition model which has been trained on features extracted from training samples tagged with document-level entity tags. Each training sample includes at least one text sequence. A text document to be labeled with named entities is received. The text document is tagged with at least one document-level entity tag. A document-specific gazetteer is generated, based on the at least one document-level entity tag. The document-specific gazetteer includes a set entries, one entry for each of a set of entity names. For a text sequence of the document, features are extracted for tokens of the text sequence, the features including document-specific features for tokens matching at least a part of the entity name of one of the gazetteer entries. Entity labels are predicted for tokens in the document text sequence with the named entity recognition model, based on the extracted features.

At least one of the generating, extracting, and predicting may be performed with a processor.

In accordance with another aspect of the exemplary embodiment, an entity recognition system includes memory which stores a named entity recognition model which has been trained on features extracted from text sequences tagged with document-level entity tags. A gazetteer generator generates a document-specific gazetteer for an input text document to be labeled with entity labels. The text document is tagged with at least one document-level entity tag. The document-specific gazetteer includes an entry based on each of the at least one document-level entity tag. The gazetteer entry includes an entity name and optionally an entity type selected from a predefined set of entity types. A feature extraction component, for a text sequence of the text document, extracts features for tokens of the text sequence, the features including document-specific features for tokens matching one of the gazetteer entries. A recognition component predicts entity labels for at least some of the tokens in the text sequence with the named entity recognition model, based on the extracted features. A processor, in communication with the memory, implements the gazetteer generator, feature extraction component and recognition component.

In accordance with another aspect of the exemplary embodiment, a method for training a named entity recognition includes receiving a collection of annotated training samples. Each training sample in the collection including at least one training sequence of tokens. Each training sample is tagged with at least one document-level entity tag which includes an entity name that corresponds to a mention in the sample without being aligned with the mention. Each of the training sequences is annotated with token-level entity labels. For each training sample, a document-specific gazetteer is generated, based on the at least one document-level entity tag of the annotated training sample. The document-specific gazetteer includes a set of entries, each entry including a respective entity name. Using the document-specific gazetteer, features are extracted for tokens of the annotated training sequences. The features include document-specific features. The document-specific features are selected from the group consisting of a feature indicating whether a token matches the initial token of a gazetteer entity name of at least two tokens, a feature indicating whether a token matches an intermediate token of a gazetteer entity name of at least three tokens, a feature indicating whether a token matches a final token of a gazetteer entity name of at least two tokens, and a feature indicating whether a token matches a unigram gazetteer entity name. A named entity recognition model is trained with the extracted features and the token-level entity labels for each training sequence.

At least one of the generating, extracting and training may be performed with a processor.

DETAILED DESCRIPTION

Figure 1:
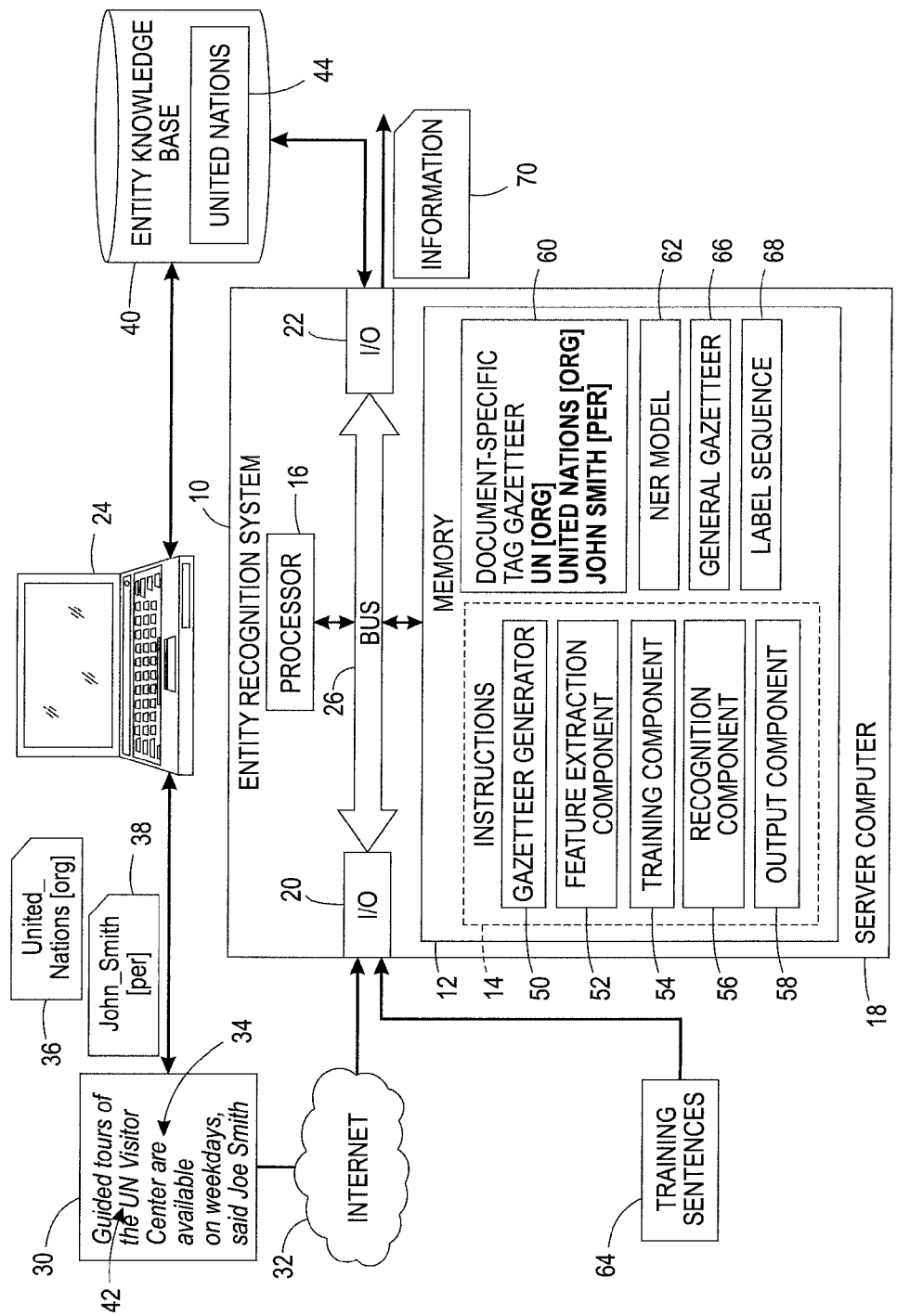
FIG. 1 is a functional block diagram of a named entity recognition system in accordance with one aspect of the exemplary embodiment.

The exemplary embodiment relates to named entity recognition (NER) system and methods for using and training a named entity recognition in which each document has (at training and prediction time) one or more document-level entity tags, each document-level entity tag referring to a respective entity that is known to appear in the document. The document-level entity tags are used in encoding features of the document, which are input to an NER recognition model.

The document-level entity tags may include canonical names of entities, such as an identifier in a knowledge base (e.g., a Wikipedia title or URL). Each tag may be associated with an entity type, selected from a set of two or more entity types, such as PERSON, ORGANIZATION, LOCATION, MISCELLANEOUS (which covers entity names that are not in the other types), etc. While these tags have a gold-standard type assigned (it is assumed to be correct), the tags are not aligned to phrases in the text, and may not share the same form as any or all of their mentions. For example, the tag United Nations may be associated with a document with the mention UN. Each tag matches at least one mention in the document, but does not specify which mention. The tags may come from another knowledge base, or be a requirement in cases where very high accuracy NER is required. In the latter case, assigning document-level tags and types may be less time consuming than marking each mention in the document, and therefore more feasible.

The gold-standard document-level tags given at prediction time allow a one sense per document assumption to be made, based on an inference that document authors do not usually provide ambiguous names. For example, a document mentioning UN with reference to the United Nations would not likely use the same acronym to refer to the University of Nebraska, for example.

There are various applications where the exemplary document-level entity tags may be used, such as:

1. Customer Care: document-level entity tags may be found in a customer relationship management system and be used to improve NER in web chat transcripts. For example, it may be advantageous to tag customer-related entities (e.g., name, device, etc.) reliably, e.g., in real time. The name of the customer could be tagged in the chat transcript, allowing further information to be retrieved from a knowledge base. High-accuracy NER also enables downstream offline processing, such as knowledge acquisition. Document-level tags could be applied as the chat proceeds, or subsequently.

2. Document Indexing: document-level entity tags of relevant entities may be used to index news stories. This is the case, for example, for the New York Times Annotated Corpus (https://catalog.Idc.upenn.edu/LDC2008T19), which is stated to have over 1,500,000 news-related articles manually tagged by library scientists with tags drawn from a normalized indexing vocabulary of people, organizations, locations and topic descriptors.

The information provided by these document-level entity tags can thus be used for improving NER without the need to use large gazetteers, although the use of gazetteers is not excluded. Even a few document-level entity tags per document can provide useful information. Additionally, the document-level entity tags may be enhanced with information from an external knowledge base.

The method is not limited to these applications but may be generalized to other applications where document-level tags are provided for unstructured text and, in particular, where mentions to a same one of the entities occur more than once in the document, e.g., to improve efficiency of a human annotator, by proposing the labels of additional mentions to the human annotator for validation, or by automatically labeling them.

Figure 2:
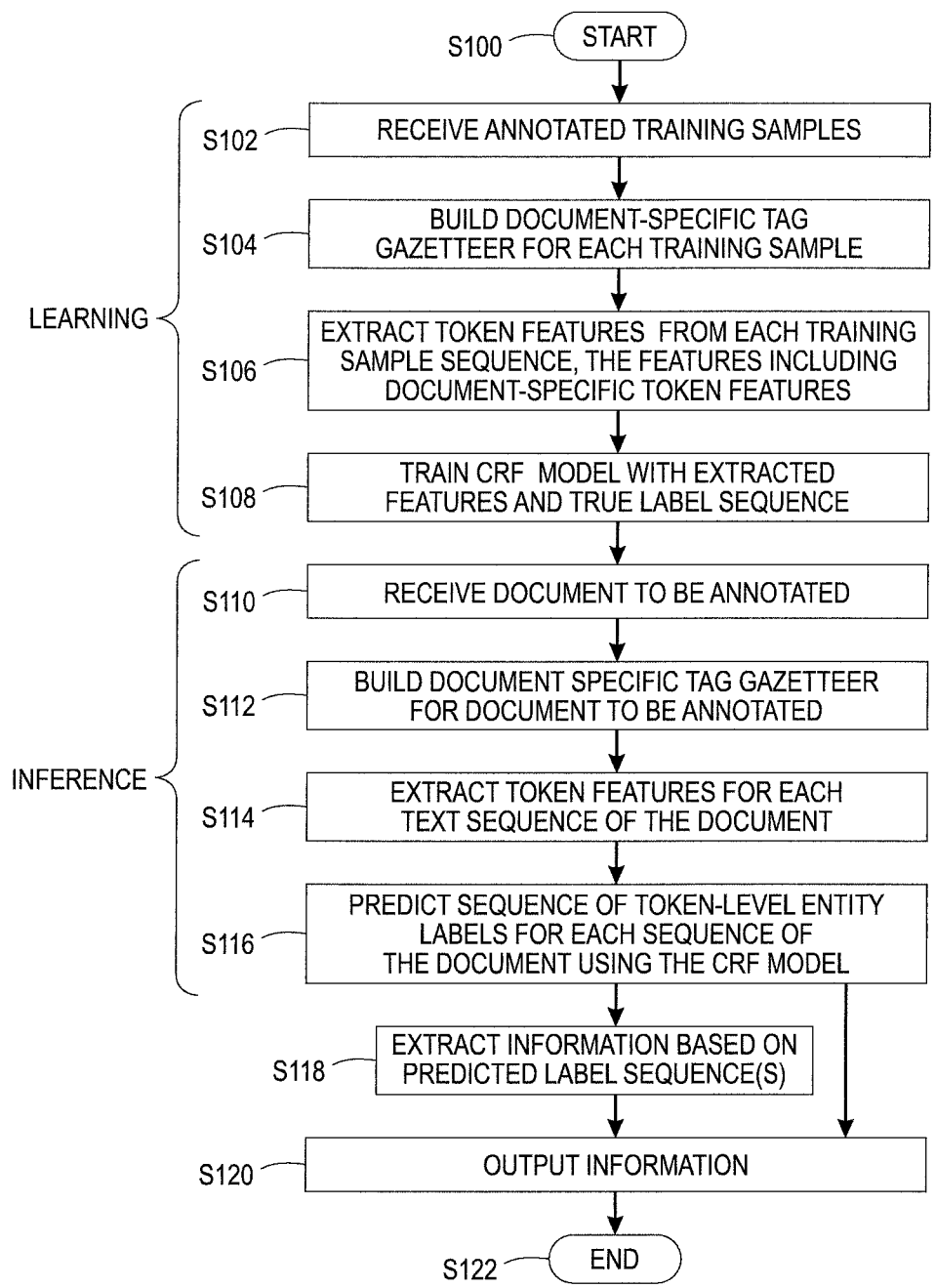
FIG. 2 is a flow chart illustrating a method for named entity recognition in accordance with another aspect of the exemplary embodiment.

With reference to FIG. 1, a computer-implemented entity recognition system 10 includes memory 12 which stores software instructions 14 for performing an entity recognition method as illustrated in FIG. 2 and a processor device ("processor") 16, in communication with the memory 12, for executing the instructions. The system 10 may be resident on one or more computing devices, such as the illustrated server computer 18. The system includes one or more input/output devices 20, 22, for communication with external devices, such as the illustrated client computing device 24. Hardware components 12, 16, 20, 22 of the system communicate by a data control bus 26.

The system 10 receives as input one or more documents 30 to be processed, e.g., from the client device 24, via a wired or wireless link 32, such as the Internet. The document 30 includes text 34 and at least one document-level entity annotation (tag) 36, 38 that is known or assumed to be correct, i.e., have at least one mention which refers to that entity in the document 30, but which is non-aligned, i.e., is not associated with those token(s) of the text which mention the entity, or, more generally, with any specific sequence which is less than the entire document. In practice, therefore, the training samples and the input documents are each longer, in terms of number of tokens, than the respective mention(s) of the entities that they contain.

Some of the document-level entity tags 36 each identify a specific knowledge base (KB) entity which is present in a knowledge base 40, that a user has judged to have a mention 42 in the document. As used herein, a mention can be a word or phrase which refers to an entity 44. For example, UN and United Nations could both be mentions 42 that refer to the KB entity 44 United Nations (international organization), and George Washington may be a mention that refers to George Washington, U.S. President. These document-level entity tags 36 are referred to herein as KB entity tags, since they include entity names that can be found in the KB 40 (e.g., Wikipedia) which have some overlap with the mentions in the text.

In some embodiments, other document-level entity tags 38 are used which are not found in the KB 40, and are referred to as nil link entity tags, or simply nil links. For example, a document which includes the entity Joe Smith, which the annotator knows refers to John Smith, may be tagged with a nil link entity tag 38, since the particular John Smith mentioned, a tour guide organizer, does not appear in the KB 40. In some embodiments, nil link entity tags 38 are not used.

Figure 3:
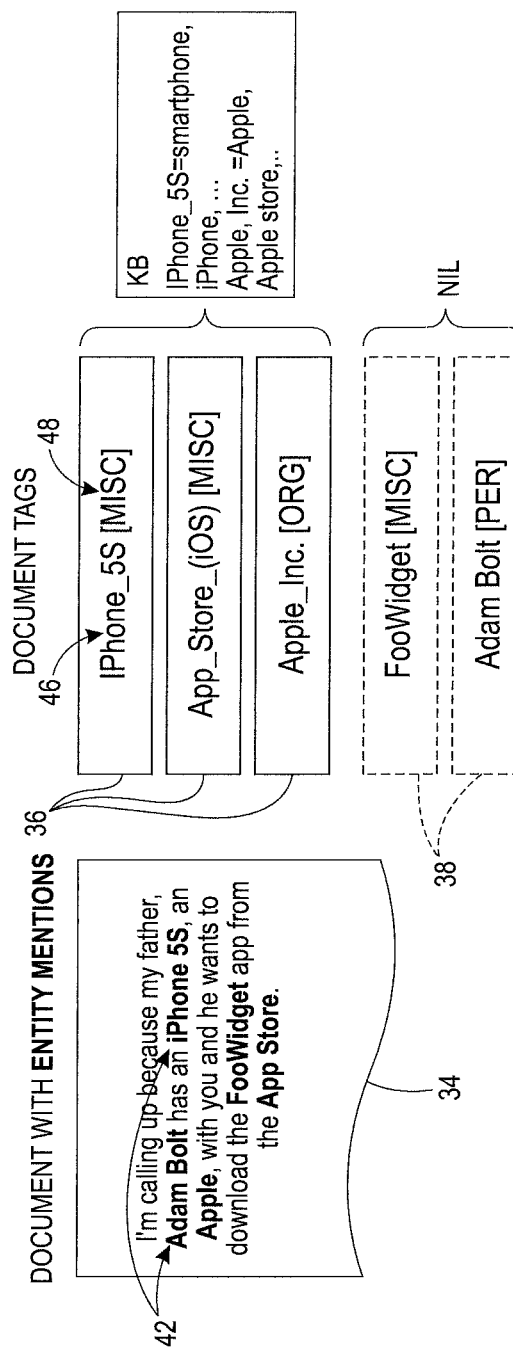
FIG. 3 illustrates a document with entity tags.

FIG. 3 shows another example text 34, with entity mentions 42 highlighted in bold (for ease of illustration only), and document-level entity tags 36, 38. The KB entity tags 36 for the KB entities may each include a canonical name 46, e.g., IPhone 5S, and a corresponding entity type 48 (MISC in the illustrated example).

Referring once more to FIG. 1, the instructions 14 include a tag gazetteer generator 50, a feature extraction component 52, an NER model training component 54, a recognition component 56, and an information output component 58.

Briefly, the tag gazetteer generator 50 uses information from the document-level KB entity tags 36 (and optionally also the nil link entity tags 38) to build a document-specific tag gazetteer 60 which includes a set of one or more entries, each entry including an entity name and a respective entity type 48, when available. If the annotator has identified a specific knowledge base title as the entity name, the knowledge base title may be converted to a readable lexical format. For example, to transform Wikipedia titles (or other encyclopedic canonical names) into useful gazetteer entries more suitable for matching in text, the titles may be transformed by one or more of lowercasing, splitting by underscores, and removing parenthesized suffixes. For example App_Store_(iOS) may be transformed to app store. For the KB entity tags 36, aliases of the entity may be extracted from the knowledge base entry and included in the gazetteer, optionally, together with the same type information as provided with the KB entity tag. In some embodiments, the entity tags 36 are used to gather extra information (related information) about the respective entity from an external KB, e.g., through links in the respective KB entry.

The feature extraction component 52 extracts features from tokens in the document 26 and provides corresponding labels to the tokens, the labels being drawn from a predefined set of two or more labels. For the document-level tags, an encoding scheme is used to designate token features based on where, in the name of the document-level entity tag or other entry in the gazetteer 60, the token matches.

As an example, an encoding scheme similar to that described in Kazama 2007 may be used to extract the token features based on where in a tag name (or other gazetteer entry) the token matches. An exemplary encoding scheme for tokens matching document-level tags uses some or all of the following as document-specific token features:

B Token matches the initial token of a gazetteer name of at least two tokens.
M Token matches a middle (i.e., intermediate: non-initial, non-final) token of a gazetteer name of at least three tokens.
E Token matches the final token of a gazetteer name of at least two tokens.
W Token matches a unigram gazetteer name.

These can be joined with type information, where it is available, to produce 16 binary document-specific token features:

B-PER Token matches the beginning of a gazetteer PER name of at least two tokens.
B-LOC Token matches the beginning of a gazetteer Loc name of at least two tokens.
B-ORG Token matches the beginning of a gazetteer ORG name of at least two tokens.
B-MISC Token matches the beginning of a gazetteer misc name of at least two tokens.
. . . and so on for M, E and W.

For example, assume there are two known entity names in the gazetteer 60, an organization and a location: New York University and New York. Two binary document-specific token features are calculated for the word New: B-ORG and B-LOC. In this way, any number of document entity tags can be available to create features, choosing all possible ones by default.

In the case where the document-level entity tags 36 are KB identifiers (e.g., Wikipedia titles), additional document-specific token features may be extracted, based on related names extracted from the KB for each document-level tag. There is an expectation that, if an entity is mentioned in a document, other entities related to it may be observed. For example, document-level entity tags may identify a Wikipedia page, from which the set of other Wikipedia pages that it points to can be extracted and used as related names. Since these are automatically extracted, their type is unknown and they can be used to generate four more binary document-specific token features: B-UNK, M-UNK, E-UNK and W-UNK.

As will be appreciated, a more simplified set of document-specific token features is contemplated, for example, if the intent is only to identify person names, only the B-PER, M-PER, E-PER and W-PER document-specific features could be used. More fine-grained token features are also contemplated, depending on the application. Document-specific token features can also be based on the document-specific token features of previous tokens in the sequence, such as:
is the immediately previous token labeled B-PER?, or the like.

As will be appreciate the complexity of prediction increases with the number of features in the set of token features, leading to an efficiency cost. Additionally, the number of training sequences needed for training the CRF model increases. In general, there may be at least 4 or at least 8, or at least 12, or at least 16, or up to 30, or up to 24, or up to 20 document-specific token features. There may be at least 5, or at least 10, or at least 20, or at least 40, or up to 100, or more standard token features.

The standard features can be any of those conventionally used, such as:
1. Features of the token itself, e.g.,
    part of speech of the token, such as is the token a noun [or pronoun, verb, adverb, adjective, etc.],
    is the first letter of the token capitalized?
    is the token mentioned in a gazetteer, which can be a preexisting, non-document specific, general gazetteer 66, such as a list of known person names, if one is available.
2. Features of a previous token(s) in the sequence, such as:
    is the immediately previous token mentioned in a gazetteer?

The exemplary NER model 62 is a statistical NER model, such as a Conditional Random Field (CRF) model. See, for example, John D. Lafferty, et al., "Conditional random fields: Probabilistic models for segmenting and labeling sequence data," Proc. 18$^{th}$ Intl Conf. on Machine Learning, ICML '01, pp. 282-289, 2001, hereinafter "Lafferty 2001", for a description of such a model. The exemplary CRF model 62 is a statistical model which, given an input sequence of tokens, such as a sentence, predicts an output sequence of the same length where each of the elements in the output is a token-level label for the corresponding token. The CRF model is very flexible for incorporating different types of features. The features of a standard CRF model can thus be augmented with the exemplary binary features described above.

The CRF model 62 operates sequentially, taking into account features of the previous token(s). As will be appreciated, the method is not limited to any particular set of features and fewer, more, and/or different features can be used. For each sequence of the input test document 30, the CRF model predicts a sequence 68 of entity labels for the tokens, the predicted labels being drawn, for example, from a set of labels (e.g., PER, LOC, ORG, MISC, and O, where O designates a token that is predicted not to be an entity name). There may be at least two or at least three, or at least four possible labels in the set of labels, with each token being assigned no more than one entity name label. Thus the number of token-level entity labels is the same as the number of tokens in the respective sequence. For example, given a document 30 which is tagged with the document-level tag 38 John York[PER] then for a sequence of that document, My name is John York, the CRF model 62 would hopefully predict a sequence of token-level entity labels: O O O PER PER (rather than O O O PER LOC).

The training component 54 generates the NER model 62 using a collection of annotated training samples 64, each sample including at least one text sequence, such as a sentence. The CRF model 62 can be trained with loss regularization, for example using an exponential loss objective function, as described, for example, in Lafferty 2001, Freund, et al., "A decision-theoretic generalization of on-line learning and an application to boosting," J. Computer and System Sciences, 55, 119-139 (1997), or Collins, M, et al. "Discriminative reranking for natural language parsing," Computational Linguistics, Vol. 31, No. 1, pp. 25-69 (2004).

The collection of training samples 64 may be selected from the same general field as the test documents 30. Each training sample in the collection 64 is tagged with a document-level entity tag 36, 38 identifying an entity name 46 and a respective one of the entity types 48, such as PERS (person) ORG (organization) LOC (location) or MISC (miscellaneous). In the exemplary method, at least some or all of the document-level entity tags correspond to entries 44 in a knowledge base, which is used to supplement the document-level tag with additional information, such as a list of possible mentions (aliases) that correspond to the a document-level entity tag. The tokens in each training sequence are each annotated with a respective token-level entity label corresponding to the correct label for that token, drawn from the set of entity labels (e.g., PER, LOC, ORG, MISC or O). Each training example is thus at least one pair of sequences: a sequence of tokens and a sequence of correct entity labels of the same length (e.g., O O O PER PER in the example My name is John York). Because the KB tags are at the document level, where the training samples are more than one sentence in length, there is no guarantee that the document-level tag will have a corresponding token in every sentence in the document, just in one of them.

The feature extraction component 52 is called on to encode the tokens of each training sentence with a label for each of the features. Thus, for each of a set of binary document-specific features, each word receives a binary feature label (e.g., 1 if the feature is extracted, 0 otherwise). Using the set of features and the corresponding sequence of correct entity labels for each of the training sentences 64, the CRF model 62 is then trained to predict the correct entity label for each of the tokens in the training sequences.

The CRF model may have previously been already trained with a basic set of features (i.e., features which are not document-specific features), using a large corpus of labeled training sentences. In this case, the training updates the CRF model to incorporate the new document-level features.

Given the trained model 62 and an input document with at least one document-level entity tag, features are extracted in the same manner as for the training sequences. The trained CRF model 62 is called on by the recognition component 56 for labeling the user document 30 with token-level entity labels. The CRF model 62 may employ a traditional support vector machines (SVM)-based classification approach to determine whether an entry from the gazetteer 60 should be associated with each token the given document 42 or not, based on the extracted features. The CFR model predicts the most probable sequence 68 of entity type labels for the tokens, given the input sentence of the document.

The information output component outputs information 70, based on the identified sequence 68, such as the sequence 68 itself, a list of named entities recognized in the document, links to the knowledge base 40 for the entity names recognized in the document, a classification of the document, based on the identified entity name(s), a retrieved set of similar documents, based on the recognized entity name(s), or a combination thereof.

In one embodiment, the system 10 may form a part of a natural language processing system, which includes a parser for processing the input text sequences to assign parts of speech and identify syntactic dependencies in the text. The parser may apply a plurality of rules which describe syntactic properties of the language of the input string. The parser may call on the entity recognition system 10 to assist in identification of named entities in the text. Natural language processing systems are described, for example, in U.S. Pub. Nos. 20040024581, 20040030551, 20060190241, 20070150257, 20070265825, 20080300857, 20080319978, 20090204596, 20100070521, 20100082331, 20130311467, and 20140163951 and U.S. Pat. Nos. 6,182,026, 6,263,335, 6,311,152, 6,975,766, 7,058,567, 7,171,350, and 8,543,563, the disclosures of which are incorporated herein by reference in their entireties, and Salah Aït-Mokhtar, et al., "Robustness beyond shallowness: incremental dependency parsing," Special Issue of the NLE Journal, 2002.

The computer-implemented system 10 may include one or more computing devices 18, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data 60, 68.

The network interface 20, 22 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 18.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

With reference to FIG. 2, an exemplary method for entity recognition is shown, which may be performed with the system of FIG. 1. The method begins at S100. An NER model learning phase may proceed as follows:

At S102, a collection 64 of annotated training sentences is received. Each of the documents may have been manually tagged with at least one document-level entity tag 36, 38.

At S104, a document-specific tag gazetteer 60 may be built for each training sentence, using the document-level entity tags 36, 38. Optionally, the tag gazetteer 60 is supplemented with information from a knowledge base, such as Wikipedia. For the training samples, the tag gazetteer 60 may include only a single entry in some cases.

At S106, for each of the training sentences, token features are extracted for each token in the sequence by the feature extraction component 52. The extracted token features include the document-specific token features and may also include standard features. The document-specific token features are extracted by comparing each token of the sequence to the document-specific tag gazetteer 60 to determine whether the token document-specific token features matches any of the entries in the gazetteer 60 and generating values for the tokens based on the matches found.

At S108, the CRF model 62 is trained using the sequence of token features of each training sentence and associated true entity label(s) for each of the tokens in the sequence, which may be in the same format as the entity name sequences 68. The training of the CRF model 62 may include training a CRF model from scratch or updating an existing CRF model, to incorporate the exemplary document-specific token features.

An inference phase may then proceed as follows:

At S110, a document 30 to be annotated with token-level named entity labels is received by the system. In general, the document 30 is not a part of the training set 64. The document 30 includes at least one text sequence, such as a sentence, and may include a plurality of (at least 2) text sequences. The document includes at least one document-level entity tag 36, 38. In some cases, a human annotator may be asked to provide, at minimum, a threshold number of document-level entity tags 36, 38, such as at least two or at least three or at least four or at least five document-level entity tags, or, where more than one document is being processed, may be asked to provide a threshold average number of document-level entity tags 36, 38, averaged over the documents, such as an average of three, four, or five. In another embodiment, the annotator may be asked to provide document-level entity tags based on a review of at least a threshold number of sentences, such as one two three, four, or five sentences, or for one or more paragraphs of the document, such as the first paragraph. In another embodiment, a named entity recognition model (which can be the same as model 60 or a different model) may be used to automatically tag named entities mentioned in the document and the human annotator may select one or more of these mentions for generating the document-level entity tag(s). In another embodiment, the document-level entity tags 36, 38 for a collection of documents is/are previously acquired from one or more annotators. In all these approaches, the annotator is not requested to identify the mention in the text which matches the document-level entity tag 36, 38, or even to identify the sentence or any other subsequence of the document where the mention is located.

At S112, a document-specific tag gazetteer 60 is built for the document, using the document-level entity tags 36, 38. Optionally, the tag gazetteer 60 is supplemented with information, such as aliases, from a corresponding entry in a knowledge base 40, such as Wikipedia, or from linked entries of the same or a different knowledge base.

At S114, for each text sequence of the document 30, token features are extracted for each token by the feature extraction component 52, using the tag gazetteer 60 for extracting the document-specific token features. The extracted token features may also include standard token features, extracted using the general gazetteer 66, or by other means. The extraction of the document-specific token features includes comparing each token in the sequence with the entity names (and types, where available) in the gazetteer 60 corresponding to each document-level entity tag to see if there is a match and setting the value of each document-specific token feature, based on the location of the matching token in the respective entity name in the gazetteer. Each token is thus assigned a value (0 or 1) for each document-specific token feature.

At S116, for each text sequence in the document 30, the respective features are input, by the recognition component 56, into to the trained CRF model 62, which outputs a predicted label sequence 68 for the text sequence which includes token-level named entity labels for each or at least some of the tokens in the sequence.

At S118, information 70 may be generated, based on the predicted label sequence 68 (or sequences) for the document. At S120, the information is output by the information output component 58. The method ends at S122.

In one embodiment, the information 70 may be used by a parser for natural language processing the input document.

In another embodiment, the CFR model 62 may be combined with a conventional statistical NER model. In one embodiment, a statistical NER model could be used to assist in annotating the documents for training and prediction, using only the tags for which a high confidence is predicted. In another embodiment a statistical NER model could be iteratively improved. This may include i) learning a baseline CRF model and tagging the data; ii) extracting document-level entity tags according to heuristics, iii) re-learning a CRF+NAME+TYPE model, and iv) re-tagging the data.

The system and method are particularly useful when applying NER to data which is not within the same domain as used for training the NER model.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Without intending to limit the scope of the exemplary embodiment, the following examples illustrate the applicability of the method.

EXAMPLES

Several configurations were generated.
The following systems were developed for comparison:
A. CRF BASELINE This system has a standard CRF model that uses context features and word-shape features, but no external knowledge features. CRFsuite is used for learning and inference. Naoaki Okazaki. CRFsuite: a fast implementation of conditional random fields (crfs) (2007) (available at http://www.chokkan.org/software/crfsuite).

B. CRF+WIDE

The CRF+WIDE system adds gazetteer features from the Illinois NER system (Lev Ratinov et al., "Design challenges and misconceptions in named entity recognition," Proc. 13th Conf. on Computational Natural Language Learning (CoNLL-2009), pp. 147-155, 2009) to the standard CRF system. There are 33 gazetteers drawn from many sources, with a total of approximately 2 million entries.

The following systems were generated in accordance with embodiments described herein, as follows:

C. CRF+NAME+TYPE

This system included a gazetteer 60 which uses document-level entity tags with entity type information (PERS, ORG, LOC, and MISC). Since type varies with context, this may not always be correct, but can be informative.

As in Kazama 2007, a tag encoding scheme was used to design document-specific token features based on where in a tag name the token matches. The coding scheme used the B, M, E, and W encoding, joined with type information where it is available, to produce 16 binary features: B-PER, B-LOC, B-ORG, B-MISC, M-PER, M-LOC, M-ORG, M-MISC, E-PER, E-LOC, E-ORG, E-MISC W-PER, W-LOC, W-ORG, W-MISC.

D. CRF+NAME+TYPE+REL

The gazetteer 60 uses the document level entity tags as described above for CRF+NAME+TYPE and uses the document-level entity tags to gather extra, related information from an external KB, for example adding UN for United Nations with the known type, if available. KB tag names, types, KB aliases and large gazetteers. The document-level entity tags are KB identifiers (Wikipedia titles). A list of related names is extracted from the KB for each tag, i.e., the Wikipedia page is used to extract the set of other Wikipedia pages that it points to and to use them as related names. Since these are automatically extracted, their type is unknown and they generate four more binary features: B-UNK, M-UNK, E-UNK and W-UNK.

The systems were evaluated on a standard NER benchmark dataset, introduced in the CoNLL 2003 shared task (see, Erik F. Tong Kim Sang, et al., "Introduction to the CoNLL-2003 shared task: Language independent named entity recognition," *Proc. 7th Conf. on Natural Language Learning at HLT-NAACL* 2003, pp. 142-147, 2003), combined with link annotations to Wikipedia (see, Johannes Hoffart, et al., "Robust disambiguation of named entities in text," Proc. 2011 Conf. on Empirical Methods in Natural Language Processing, pp. 782-792, 2011, https://www.mpi-inf.mpg.de/departments/databases-and-information-systems/research/yago-naga/aida). The dataset includes three splits, denoted TRAIN TESTA, and TESTB. A standard tag set for person (PER), organization (ORG), location (LOC) and miscellaneous (MISC) was used and the CONLLeval evaluation script. The median proportion of mentions in a document that are linked to the KB is 81% in the TRAIN and TESTB split, and 85% in TESTA.

Example 1

Table 1 shows the performance of the different system configurations on the TESTA development split of the CoNLL03 dataset. In this example, the models have access to entities drawn from all mentions in the document.

TABLE 1

Results for CoNLL03 TESTA

| Method | Precision | Recall | F-score |
|---|---|---|---|
| CRF | 88.52 | 86.86 | 87.68 |
| CRF + WIDE | 90.45 | 89.26 | 89.85 |
| CRF + NAME + TYPE | 93.29 | 92.12 | 92.70 |
| CRF + NAME + TYPE + REL | 93.17 | 92.12 | 92.65 |

The baseline performs well at 87.68% F-score, and using large gazetteers improves to 89.85% F-score. The CRF+NAME+TYPE model achieves better performance than either CRF BASELINE or CRF+WIDE at 92.7% F-score. When the document gazetteers are augmented with related untyped spans from the KB (CRF+NAME+TYPE+RELATED), the overall performance drops to 92.65% F-score.

Example 2

Figure 4:
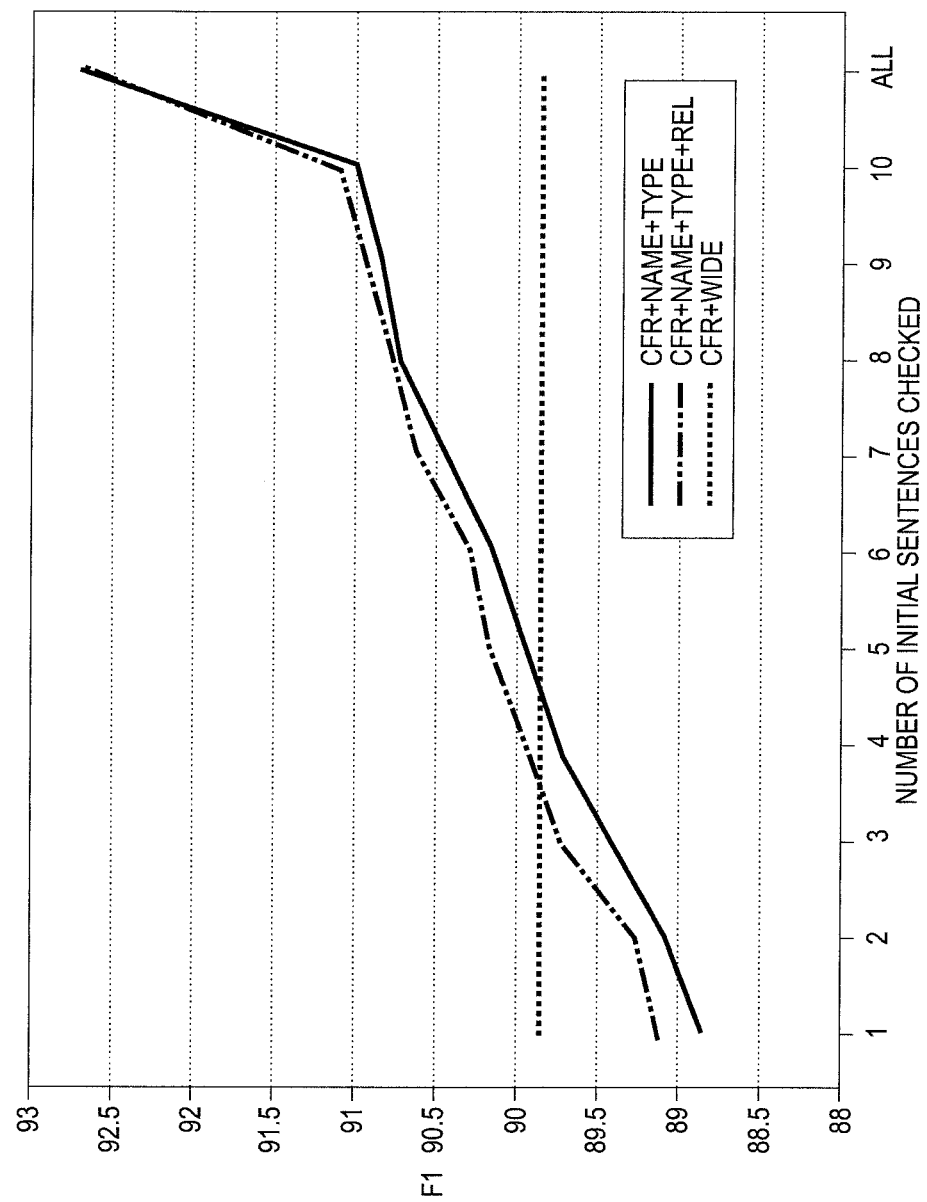
FIG. 4 shows results for different entity recognition systems for different numbers of sentences checked for entities.

Since it may not be feasible for models to have access to entities drawn from all mentions in the document, in this example the document-level gazetteers are restricted to only those entities drawn from mentions in the first n sentences. This is equivalent to asking an analyst to list entities at the document level, but only bother looking at the first n sentences. FIG. 4 shows how the two exemplary models CRF+NAME+TYPE and CRF+NAME+TYPE+REL perform in terms of F-score as their document-level gazetteer is drawn from more sentences. The results suggest that to achieve better performance than CRF+WIDE, document-level entity tags for the first 4 sentences for CRF+NAME+TYPE and the first 5 sentences for CRF+NAME+TYPE+REL (at median, 4 and 5 tags respectively) should be extracted. Augmenting document-level gazetteers with untyped KB spans is useful with fewer sentences, but reduces performance when all document-level entity tags are available.

Example 3

This example used additional systems to those described above:

E. KB Tag Matching (MATCH)

The longest full match from the document gazetteer is found and the known type is applied. This will not match partial or non-canonical names, but is expected to have high-precision. This is similar to the CoNLL 2003 baseline system (Erik F. Tjong Kim Sang, et al., "Introduction to the CoNLL-2003 shared task: Language independent named entity recognition," Proc. 7th Conf. on Natural Language Learning at HLT-NAACL 2003, pp. 142-147, 2003).

F. KB Tag Repair (CRF+REPAIR)

The text is labeled using the CRF BASELINE model, then the longest full match from the document gazetteer is found and the known type assigned. When a gazetteer match overlaps with a CRF match, the gazetteer is used and the CRF match is removed. Although consider partial matches are not considered, this may recognize longer names that can be difficult for conventional CRF models.

G. KB Tag Names (CRF+NAME)

Analogous to CRF+NAME+TYPE SYSTEM described above, but without the type information, document-specific tag features were generated, but used the same type for each entry.

H. KB Tag Names with Type and Alias (CRF+NAME+TYPE+AKA)

Analogous to CRF+NAME+TYPE SYSTEM described above, but uses the KB to augment the document-specific gazetteer with known aliases of the KB tags, for example adding UN for United Nations with the known type.

I. KB Tag Names with Type and Alias and Wide Coverage (CRF+NAME+TYPE+AKA+WIDE)

This combines KB tag names, types, KB aliases with the wide-coverage gazetteers.

J. KB Tag Names with Type and Alias and Related (CRF+NAME+TYPE+AKA+WIDE)

This combines KB tag names, types, KB aliases and related names from linked pages.

KB information is fetched and cached using a Wikipedia API client. The tag set of person (PER), organization (ORG), location (LOC) and miscellaneous (MISC) is again used and precision, recall and F-score reported from the Conlleval evaluation script.

Augmenting the gazetteer with aliases produces, on average, 26 times the number of gazetteer entries as KB tags alone in TESTA, and 23 times in TESTB.

Table 2 shows the performance of the different configurations, focusing first on TESTA overall F-scores.

TABLE 2

Results for CoNLL 2003 TESTA and TESTB. P/R/F are given for all tags and per-type F-scores. Methods starting with "+" build on the standard CRF BASELINE by repairing or adding features.

| Method | TESTA | | | | | | |
|---|---|---|---|---|---|---|---|
| | P | R | F | $F_{LOC}$ | $F_{MSC}$ | $F_{ORG}$ | $F_{PER}$ |
| MATCH | 94.93 | 39.06 | 55.35 | 76.90 | 22.01 | 29.47 | 59.24 |
| CRF BASELINE | 88.52 | 86.86 | 87.68 | 90.92 | 85.18 | 81.44 | 90.06 |
| +RPR | 89.28 | 90.24 | 89.76 | 91.68 | 87.44 | 84.44 | 92.68 |
| +WIDE | 90.45 | 89.26 | 89.85 | 92.63 | 85.99 | 84.21 | 93.00 |
| +NAME | 89.96 | 88.64 | 89.29 | 92.21 | 85.57 | 82.71 | 92.89 |
| +NAME + TYPE | 93.29 | 92.12 | 92.70 | 95.42 | 88.19 | 88.18 | 95.38 |
| +NAME + TYPE + AKA | 93.42 | 92.29 | 92.85 | 95.63 | 88.35 | 88.27 | 95.54 |
| +NAME + TYPE + AKA + WIDE | 93.13 | 92.01 | 92.57 | 95.48 | 88.34 | 87.96 | 94.97 |
| +NAME + TYPE + AKA + REL | 93.53 | 92.28 | 92.90 | | | | |

| Method | TEST B | | |
|---|---|---|---|
| | P | R | F |
| MATCH | 94.57 | 37.62 | 53.83 |
| CRF BASELINE | 81.87 | 80.93 | 81.40 |
| +RPR | 84.06 | 86.54 | 85.28 |
| +WIDE | 85.10 | 83.80 | 84.44 |
| +NAME | 84.26 | 82.72 | 83.48 |
| +NAME + TYPE | 89.46 | 87.92 | 88.69 |
| +NAME + TYPE + AKA | 89.90 | 88.74 | 89.32 |
| +NAME + TYPE + AKA + WIDE | 89.86 | 88.85 | 89.35 |
| +NAME + TYPE + AKA + REL | 90.05 | 88.77 | 89.41 |

In the case of MATCH, matching against KB tag names results in high-precision but low recall with an F-score of 55.35%, far worse than the baseline CRF at 87.68%. Despite its naïve assumptions, repairing the CRF tags using longest matches in the document gazetteer performs surprisingly well at 89.76%, just lower than using wide coverage gazetteers, with an F-score of 89.85%. The first setting that uses KB tags as CRF features, CRF+NAME, includes typeless names and has an F-score of 89.29%. Precision and recall are lower than wide coverage gazetteers, suggesting that, without type information, bigger gazetteers are better. Adding type features (CRF+NAME+TYPE) results in better performance than either CRF or CRF+WIDE at 92.7% F-score. Attempts to manually map the 33 gazetteer filenames to the 4 NER types was found to reduce performance on TESTA. Augmenting the document gazetteers using aliases from the KB further improves F-score for aliases (92.85%). Adding wide-coverage gazetteers to KB tags slightly decreases F-score at 92.57%.

To understand how KB tags help NER better, the per-tag F-scores for TESTA were examined. Using CRF+NAME+TYPE+AKA, an F-score of around 95.5% was obtain for PER and LOC entities. As with CRF+WIDE, MISC entities remain hard to tag correctly. However, if the percentage F-score gain by type over the CRF baseline is considered, CRF+WIDE gazetteers improve performance most for PER (+2.94%), then ORG (2.77%) entities. The top two are reversed for CRF+NAME+TYPE+AKA, with ORG (+6.83%), then PER (+5.48%). This suggests that KB tags are particularly well-suited for helping recognize organization names. Similar trends are observed in TESTB, except KB tags and CRF+WIDE are complementary.

The results suggest that if KB tags are available, they improve NER. However, the models above use all possible KB tags and should be considered an upper bound. To model the case of busy workers better, the gazetteers are restricted to only the KB tags from mentions in the first n sentences. This corresponds to the case of asking an annotator to only review the first n sentences.

Figure 5:
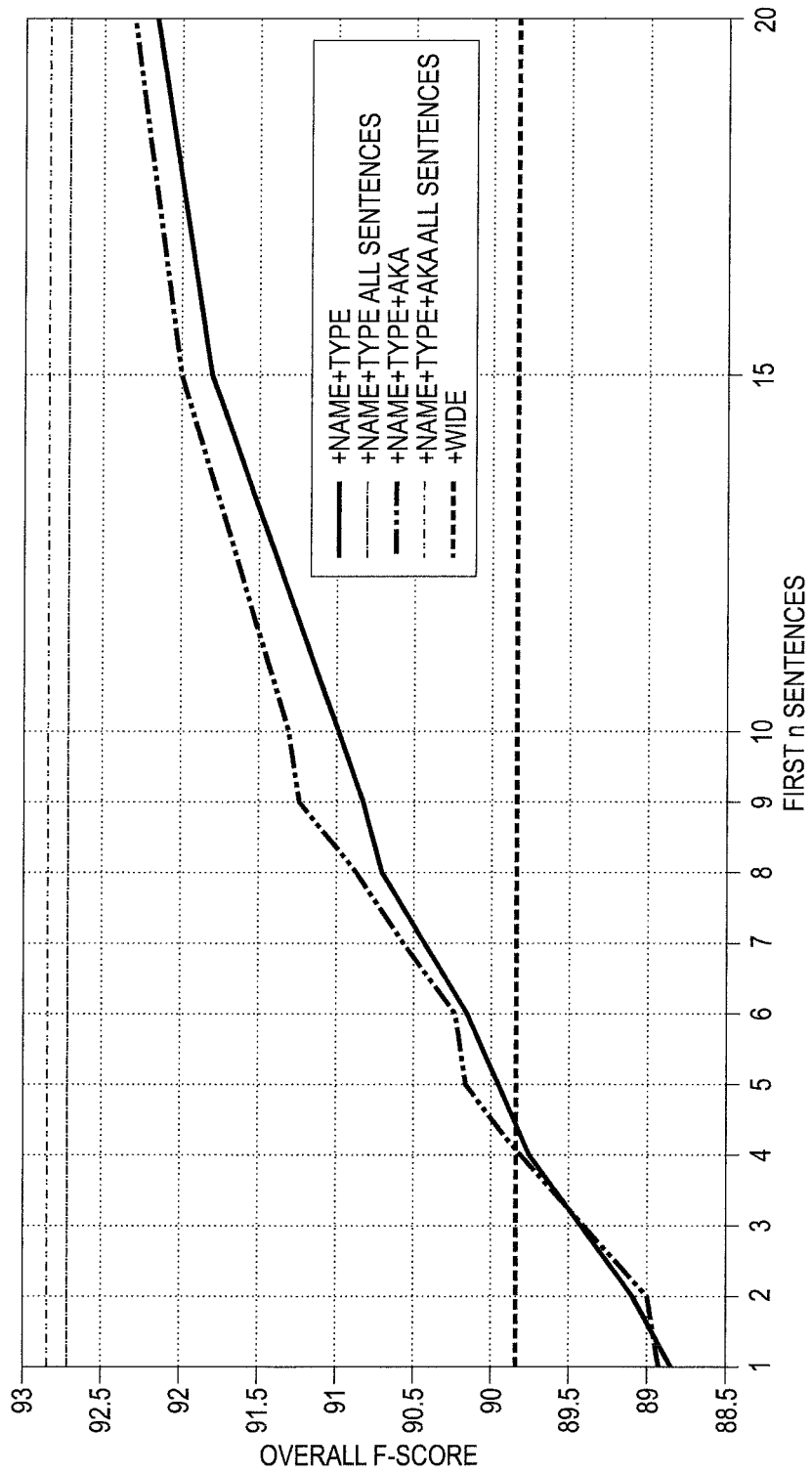
FIG. 5 shows results for different entity recognition systems for different numbers of sentences checked for entities in another evaluation.

FIG. 5 shows how the KB tag models perform on CRF+WIDE with increase in n. The results suggest that to achieve better performance than CRF+WIDE, the first 5 sentences should be reviewed for CRF+NAME+TYPE. Adding aliases (CRF+NAME+TYPE+AKA) reduces performance slightly when only using a few sentences, but with more than 4 sentences, aliases are consistently useful. This trend is also apparent in TESTB, showing that augmenting tags with KB information improves NER, especially when only a few tags are available.

The results suggest that KB entity tags 36 that are known to be correct, but not aligned to the text is useful for NER recognition. The document-specific gazetteers may be built from named entities recognized by the human annotator in the first n sentences, as in the examples, or form anywhere in the document. Using a CRF model allows taking advantage of this evidence in a principled manner. The experiments show that with only a handful of document-level tags, the same results can be achieved as when using very large gazetteers, which may be considered a good investment in situations that require high accuracy NER. The number of KB entity tags 36 is reduced if the system also takes advantage of the KB to expand the gazetteer with untyped names, which helps when only a few tags are supplied.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An entity recognition method comprising:
providing a named entity recognition model which has been trained on features extracted from training samples tagged with document-level entity tags, each training sample comprising at least one text sequence;
receiving a text document to be labeled, the text document being tagged with at least one document-level entity tag;
generating a document-specific gazetteer based on the at least one document-level entity tag, the document-specific gazetteer including a set of entries, one entry for each of a set of entity names;
for a text sequence of the text document, extracting features for tokens of the text sequence, the features including document-specific features for tokens matching at least a part of the entity name of one of the gazetteer entries, the document-specific features comprising at least 12 document-specific features;
predicting entity labels for tokens in the document text sequence with the named entity recognition model, based on the extracted features, and
wherein at least one of the generating, extracting, and predicting is performed with a processor.

2. The method of claim 1, further comprising training the named entity recognition model.

3. An entity recognition method comprising:
training a named entity recognition model on features extracted from training samples tagged with document-level entity tags, each training sample comprising at least one text sequence, wherein the training comprises:

receiving annotated training samples, each training sample being tagged with at least one document-level entity tag having a mention in at least one of the text sequences of the training sample, each text sequences of the training sample being annotated with token-level entity labels;

for each training sample, generating a document-specific gazetteer based on the at least one document-level entity tag of the annotated training sample, the document-specific gazetteer including a set of entity names;

using the document-specific gazetteer, extracting features for tokens of each text sequence in the training sample, the features including document-specific features; and training the named entity recognition model with the extracted features and the token-level entity labels for each training sequence;

receiving a text document to be labeled, the text document being tagged with at least one document-level entity tag;

generating a document-specific gazetteer based on the at least one document-level entity tag, the document-specific gazetteer including a set entries, one entry for each of a set of entity names;

for a text sequence of the text document, extracting features for tokens of the text sequence, the features including document-specific features for tokens matching at least a part of the entity name of one of the gazetteer entries;

predicting entity labels for tokens in the document text sequence with the named entity recognition model, based on the extracted features, and wherein at least one of the generating, extracting, and predicting is performed with a processor.

4. The method of claim 1, wherein the named entity recognition module is a conditional random field model.

5. The method of claim 1, wherein the document-specific features are binary features.

6. The method of claim 1, wherein the document-specific features include features selected from the group consisting of:
a feature indicating whether a token matches an initial token of a gazetteer entity name of at least two tokens;
a feature indicating whether a token matches an intermediate token of a gazetteer entity name of at least three tokens;
a feature indicating whether a token matches a final token of a gazetteer entity name of at least two tokens; and
a feature indicating whether a token matches a unigram gazetteer entity name.

7. The method of claim 6, wherein the document-specific features include at least three of the features in the group.

8. The method of claim 6, wherein at least some of the selected document-specific features are each associated with an entity name type selected from a plurality of entity name types.

9. The method of claim 8, wherein the plurality of entity name types includes at least three entity name types.

10. The method of claim 8, wherein the plurality of entity name types is selected from the group consisting of:
a person name;
a location name;
an organization name; and
a miscellaneous name which covers entity names that are not in other types.

11. The method of claim 1, wherein the document-specific features for tokens matching at least a part of one of the entity names in the set of entity names comprise at least 12 document-specific features.

12. The method of claim 11, wherein the document-specific features for tokens matching at least a part of one of the entity names in the set of entity names comprise at least 16 document-specific features.

13. The method of claim 7, wherein the document-specific features further include features for gazetteer entries generated from links to other entries, the links being identified from a knowledge base entry corresponding to one of the document-level entity tags.

14. The method of claim 1, wherein the at least one document-level entity tag for the text document to be labeled includes a name and a type selected from a predefined set of types.

15. An entity recognition method, comprising:
providing a named entity recognition model which has been trained on features extracted from training samples tagged with document-level entity tags, each training sample comprising at least one text sequence;
receiving a text document to be labeled, the text document being tagged with at least one document-level entity tag, the at least one document-level entity tag for the text document to be labeled having at least one mention in the text document which refers to that entity, and the at least one document-level entity tag not being aligned to a specific token or specific sequence of tokens in the text document;
providing a named entity recognition model which has been trained on features extracted from training samples tagged with document-level entity tags, each training sample comprising at least one text sequence;
receiving a text document to be labeled, the text document being tagged with at least one document-level entity tag;
generating a document-specific gazetteer based on the at least one document-level entity tag, the document-specific gazetteer including a set entries, one entry for each of a set of entity names;
for a text sequence of the text document, extracting features for tokens of the text sequence, the features including document-specific features for tokens matching at least a part of the entity name of one of the gazetteer entries;
predicting entity labels for tokens in the document text sequence with the named entity recognition model, based on the extracted features, and
wherein at least one of the generating, extracting, and predicting is performed with a processor.

16. The method of claim 1, wherein the generating of the document-specific gazetteer for the text document to be labeled includes retrieving aliases for the at least one document-level entity tag from a knowledge base entry for a respective entity name.

17. The method of claim 1, wherein the method further comprises outputting information based on the predicted entity labels.

18. A computer program product comprising a non-transitory recording medium storing instructions, which when executed on a computer, causes the computer to perform the method of claim 1.

19. An entity recognition system comprising:
memory which stores a named entity recognition model which has been trained on features extracted from text sequences tagged with document-level entity tags;
a gazetteer generator which generates a document-specific gazetteer for an input text document to be labeled with named entities, the text document being tagged with at least one document-level entity tag, the document-specific gazetteer including an entry based on each of the at least one document-level entity tag, the gazetteer entry including an entity name and optionally an entity type selected from a predefined set of entity types;
a feature extraction component which, for a text sequence of the text document, extracts features for tokens of the text sequence, the features including document-specific features for tokens matching one of the gazetteer entries, the document-specific features include features selected from the group consisting of:
  a feature indicating whether a token matches an initial token of a gazetteer entity name of at least two tokens;
  a feature indicating whether a token matches an intermediate token of a gazetteer entity name of at least three tokens;
  a feature indicating whether a token matches a final token of a gazetteer entity name of at least two tokens; and
  a feature indicating whether a token matches a unigram gazetteer entity name;
a recognition component which predicts entity labels for at least some of the tokens in the text sequence with the named entity recognition model, based on the extracted features, and
a processor, in communication with the memory, which implements the gazetteer generator, feature extraction component and recognition component.

20. A method for training a named entity recognition system comprising:
receiving a collection of training samples, each training sample including at least one annotated training sequence, each training sequence comprising a sequence of tokens, each training sample being tagged with at least one document-level entity tag which includes an entity name that corresponds to a mention in the sample without being aligned with the mention, each of the training sequences being annotated with token-level entity labels;
for each training sample, generating a document-specific gazetteer based on the at least one document-level entity tag of the annotated training sample, the document-specific gazetteer including a set of entries, each entry including a respective entity name;
using the document-specific gazetteer, extracting features for tokens of the annotated training sequences, the features including document-specific features, the document-specific features being selected from the group consisting of:
  a feature indicating whether a token matches an initial token of a gazetteer entity name of at least two tokens,
  a feature indicating whether a token matches an intermediate token of a gazetteer entity name of at least three tokens,
  a feature indicating whether a token matches a final token of a gazetteer entity name of at least two tokens, and
  a feature indicating whether a token matches a unigram gazetteer entity name; and
training a named entity recognition model with the extracted features and the token-level entity labels for each training sequence,
  wherein the generating, extracting and training are performed with a processor.

* * * * *